United States Patent [19]

Langsam

[11] Patent Number: 4,835,229
[45] Date of Patent: May 30, 1989

[54] CATALYST AND PROCESS FOR THE PREPARATION OF TRI-SUBSTITUTED SILYLALKYNES

[75] Inventor: Michael Langsam, Allentown, Pa.

[73] Assignee: Air Products and Chemicals, Inc., Allentown, Pa.

[21] Appl. No.: 187,803

[22] Filed: Apr. 29, 1988

[51] Int. Cl.$^4$ .............................. C08F 4/20; C08F 4/22
[52] U.S. Cl. ..................................... 526/147; 502/167; 526/279
[58] Field of Search ................................ 526/147, 279

[56] References Cited

U.S. PATENT DOCUMENTS

| | | | |
|---|---|---|---|
| 3,852,235 | 12/1974 | Krutchen | 526/147 X |
| 4,607,088 | 8/1986 | Nomura et al. | 526/279 |
| 4,657,564 | 4/1987 | Langsam | 55/16 |
| 4,778,868 | 10/1988 | Higashimura et al. | 526/279 X |

FOREIGN PATENT DOCUMENTS 2135319A  8/1984  United Kingdom .

OTHER PUBLICATIONS

T. Masuda et al., "Polymerization of 1-(Trimethylsilyl)-1-propyne by Halides of Niobium(V) and Tantalum(V) and Polymer Properties", Macromolecules 1985, 18, 841–845.

T. Masuda et al., "Polymerization of Methylpentynes by Transition Metal Catalysts: Monomer Structure, Reactivity, and Polymer Properties", Polymer Journal, vol. 14, No. 5, pp. 371–377 (1982).

T. Masuda et al., "Synthesis of High Polymers from Substituted Acetylenes: Exploitation of Molybdenum- and Tungsten-Based Catalysts", Acc. Chem. Res., vol. 17, pp. 51–56 (1984).

*Primary Examiner*—Patrick P. Garvin
*Attorney, Agent, or Firm*—Mark L. Rodgers; William F. Marsh; James C. Simmons

[57] ABSTRACT

Polymeric tri-substituted silylalkynes useful for forming gas separation membranes are prepared at accelerated polymerization rates and increased molecular weights by employing at polymerization temperatures a binary catalyst system of Group VB or VIB metal halide such as TaCl$_5$ and a tertiary amine compound such as pyridine in an aromatic solvent.

11 Claims, No Drawings

CATALYST AND PROCESS FOR THE PREPARATION OF TRI-SUBSTITUTED SILYLALKYNES

FIELD OF INVENTION

The present invention relates to an improvement in a process for the preparation of polymeric tri-substituted silylalkynes which may be cast into membrane from and used to separte components of a gas mixture.

BACKGROUND OF THE INVENTION

The preparation of polymeric tri-substituted silylalkynes employing an organic solvent and a suitable catalyst such as $TaCl_5$, $MoCl_5$, $NbCl_5$ or other Group VB or IVB metal halides is known, as is the formation of polymeric membranes and gas separation processes using the polymeric membranes.

The preparation of poly(trialkylsilylpropyne) and treated, semi-permeable polymeric membranes comprising a polymer having the general structural formula:

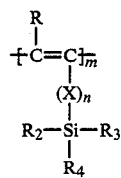

wherein $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl group or aryl group; X is a $C_1$-$C_3$ alkyl group or phenyl; m is at least 100 and n is 0 or 1, is disclosed in the Langsam U.S. Pat. No. 4,657,564. These polymers are prepared from tri-substituted (silylalkynes), the polymerization method therefore being incorporated herein by reference.

G.B. patent application No. 2,135,319A discloses the polymerization of one or more 1-monoalkyl ($C_1$-$C_{12}$) dimethysilylpropynes using various silypropyne monomers in the presence of halides of transition metals of Group VB of the Periodic Table. Organo-aluminum compounds are described as co-catalysts.

The polymerization of 1-(trimethylsilyl)-1-propyne employing pentahalides of niobium and tantalum in a toluene solution at 80° C. along with the effects of solvents and temperature are described in an article by T. Masuda, et al. entitled "Polymerization of 1-(trimethylsilyl)-1-propyne by Halides of Niobium (V) and Tantalum (V) and Polymer Properties," Macromolecules Vol. 18, No. 5, pp. 841–845 (1985).

Molybdenum and other methyl halides are disclosed as catalysts for the polymerization of sterically hindered acetylenes and dialkyl-acetylenes in a solvent by T. Masuda, et al. in an article entitled, "Polymerization of Methylpentynes by Transition Metal Catalysts: Monomer Structure, Reactivity, and Polymer Properties" Polymer Journal, Vol. 4, No. 5, pp 371–377 (1982).

T. Masuda in an article entitled "Synthesis of High Polymers from Substituted Acetylenes: Exploitation of Molybdenum and Tungsten-Based Catalysts," Acc. Chem. Res., Vol 17, pp. 51–56 (1984) discloses the polymerization of aromatic and aliphatic acetylenes.

The present invention is based on the discovery that the addition of tertiary amines to a solution containing Group VB or VIB metal halide catalysts or mixtures thereof forms a very active binary catalyst system which accelerates the polymerization of tri-substituted sylalkynes, particularly trimethylsilypropyne, and increases the molecular weights of the resultant polymer beyond what would normally be expected by prior art processes.

SUMMARY OF THE INVENTION

The present invention is based on the unexpected discovery that it is possible to increase the polymerization rate of tri-substituted silylalkynes and especially trimethylsilylpropyne by employing at polymerization temperatures a combination of a Group VB or VIB metal halide catalyst, such as $TaCl_5$, $MoCl_5$ and $NbCl_5$ and the like, and a tertiary amine (no available NH bonds), such as triethyl amine, in a solvent and at the same time increase the polymer molecular weight.

It is a primary object of this invention to provide an improved process for the preparation of polymeric tri-substituted silylalkynes useful for casting into membrane form for separating gas components as described for example in U.S. Pat. No. 4,657,564.

It is another object of this invention to provide a novel highly reactive catalyst for the polymerization of trimethylsilylpropyne and other tri-substituted silylalkynes comprising a combination of a Group VB or Group VIB metal halide and a tertiary amine compound.

These and other objects and advantages of this invention will become apparent from the description of the invention which follows, and from the claims.

DETAILED DESCRIPTION OF THE INVENTION

In accordance with the present invention a tri-substituted silylalkyne polymer having the general structural formula

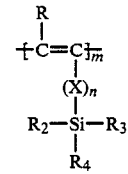

wherein $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl group or aryl group; X is a $C_1$-$C_3$ alkyl group or phenyl; m is at least 100 and n is 0 or 1, is produced in an organic solvent solution at polymerization temperatures of from about 30° C. to about 100° C., preferably from about 50° C. to about 100° C. and more preferably from 70° C. to 90° C. in the presence of a binary catalyst comprising a combination of a Group VB or VIB metal halide and a tertiary amine compound. The discovery of this very active form of catalyst system allows polymerization in the rigid pore of a microporous film and accelerates the polymerization process and increases the molecular weight of the polymer produced.

Generally, the rate of polymerization of a tri-substituted silylalkyne such as trimethyl silylpropyne is dependent on the input process parameters of polymerization temperature (Tp) and catalyst/monomer ratio (C/M). In order to increase the rate of polymerization according to prior art process systems one can either increase the polymerization temperature or increase the ratio of catalyst to monomer. Increasing the Tp and/or the C/M ratio will increase the rate of polymerization but typically results in a decrease in the molecular weight and intrinsic viscosity of the resultant polymer. Increasing both the Tp and the C/M ratio will also result in a reduction in the molecular weight of the polymer.

The change in molecular weight as a function of Tp and C/M ratios have been carried out in a number of experimental runs and the results are shown in Table 1 below. The data set forth illustrates the Brookfield viscosity of intrinsic viscosity as a function of Tp and C/M ratio in addition to the permeability of various gases through formed membranes of equal thickness. Table 1 clearly demonstrates that in all of the experimental runs high molecular weight polymer can be achieved only at a combination of low Tp and/or C/M.

TABLE 1

| Run* | 1 | 2 | 3 | 4 | 5 | 6 |
|---|---|---|---|---|---|---|
| $TaCl_5$ | 1.91 | 1.91 | .48 | .48 | 1.20 | 1.20 |
| Tp | 25 | 83 | 25 | 83 | 56 | 56 |
| Yield (%) | 91.3 | 94.7 | 94.0 | 93.3 | 96.0 | 95.3 |
| BV[1] | 808 | 140 | 1,420 | 1,000 | 6,325 | 660 |
| IV[2] | 4.72 | 3.10 | 5.93 | 5.60 | 4.05 | 4.00 |
| Mw × $10^{+4}$[3] | 62.2 | 41.5 | 77.5 | 73.3 | 53.7 | 53.0 |
| Permeability |  |  |  |  |  |  |
| He | 6514 | 6029 | 5547 | 6148 | — | 6421 |
| $O_2$ | 10394 | 9078 | 8288 | 9491 | — | 9638 |
| $N_2$ | 7324 | 6436 | 6122 | 6755 | — | 7001 |
| $CO_2$ | 37903 | 31772 | 28838 | 34500 | — | 31445 |
| $aO_2/N_2$ | 1.42 | 1.41 | 1.35 | 1.41 | — | 1.38 |
| M/C[5] | 1 | 1 | 1 | 1 | 1 | 1 |
| ratio | .04 | .04 | .01 | .01 | .025 | .025 |

[1] Brookfield Viscosity in toluene @ 1.5% TS in centipoise
[2] Standard Intrinsic Viscosity at 30° C. in toluene per ASTM D1243-60A.
[3] Molecular Weight - calculated from $[\eta] = KM^aK$  $4.45 \times 10^{-6} a$  1.04.
[4] Permeability Coefficient for Composite Membrane in Scc/sec l/$cm^2$ $cm^1$/cm × $10^{+10}$
[5] Monomer to TaCl5 mole ratio.

The tertiary amine compounds employed along with the Group VB or VIB metal halides to form the binary catalyst system of the present invention may be used in up to equal molar amounts based on the metal halide employed. Greater amounts may also be employed but do not appear to provide any particular advanatage. Generally, between about 5 and 100 and preferably between about 5 and about 25 mole percent tertiary amine is employed based on the group VB or VIB metal halide. The tertiary amines may be aliphatic, cycloaliphatic, alkylatedaryl or aromatic amine compounds. Representative tertiary amines for use in the process of the invention includes, for example, the trialkylamines such as the trimethyl, triethyl, tripropyl, tributyl, trihexyl, trioctyl, tridecyl, etc. amines, tri-phenylamine, n-dodecyldimethlamine, n-tetra-decyldimethylamine, n-hexyldecyldimethylamine, N,N,N[1], N[1]-tetramethylethylenediamine, 1,4-diazabicycle [2.2.2]octane, 4(N,N-dimethylamino)pyridine, pyridine, 1,5-diazabicycle [3.4.0]non-5-ene, 1,8-diazabicycle [5.4.0]-undec-T-ene, methyldiethylamine, butyldimethylamine, benzyldimethylamine, N,N-di-methylaniline and the like.

The organic solvents employed in the present invention may be any aromatic or substituted aromatic hydrocarbon solvents which are stable and chemically inert to the polarization system and include, for example, benzene, toluene, xylene, chlorobenzenes, nitrobenzenes, nitrotoluenes, bromobenzenes and the like. Tolluene is the preferred solvent for the polymerization system.

A number of experiments were carried out using various amines along with $TaCl_5$ and other variables to demonstrate the novel effect tertiary amines have on the molecular weight of poly(trimethylsilylpropyne). These examples are provided to illustrate the invention in accordance with principles of the invention and include particular features of the invention. However, the examples are not to be construed as limiting the invention in any way, it being understood that numerous variations are possible without departing from the spirit and scope of the invention.

EXAMPLE 1

Several runs were carried out in which trimethyl silylpropyne (TMSP) was polymerized for a period of 6 hours. The $TaCl_5$ and tertiary amines were mixed with toluene as solvent and stirred for 30 minutes to dissolve the $TaCl_5$ after which the trimethylsilylpropyne was added with heating and stirring. After the polymerization period, the reaction mixture was quenched in methanol, washed with additional methanol and then dried, leaving a trimethylsilylpropyne polymer (PTMSP) for analysis. Run 1 is comparative and was carried out in the absence of a tertiary amine. The results of these runs are reported in Table 2 below.

TABLE 2

| Run No. | 1 | 2 | 3 | 4 | 5 |
|---|---|---|---|---|---|
| Solvent (gms) | 100 | 50 | 50 | 50 | 50 |
| $TaCl_5$ (gms) | 1.91 | 1.0 | 1.0 | 1.0 | 1.0 |
| TMSP (gms) | 15 | 7.5 | 7.5 | 7.5 | 7.5 |
| Tp (°C.) | 100 | 100 | 100 | 100 | 83 |
| Run No. | 1 | 2 | 3 | 4 | 5 |
| Amine Additive |  |  |  |  |  |
| NDMA(ml)[1] | — | 0.120 | — | — | 0.10 |
| Pyridine (ml) | — | — | .10 | — | — |
| TEA (ml)[2] | — | — | — | .10 | — |
| Yield (%) | 93 | 100 | 100 | 87 | 100 |
| BV[3] | 35 | 684 | 300 | 76 | 525 |
| IV[4] | 3.0 | 6.01 | — | — | 6.20 |

[1] N,N—dimethylaniline
[2] Triethylamine
[3] Brookfield Viscosity in Toluene @ 1.5% in Centipoise
[4] Standard Intrinsic Viscosity (ASTM D1243-60A)

The results reported in Table 2 above clearly show that employing a tertiary amine along with the metal halide catalyst significantly increases the molecular weight (as evidenced by an increase in viscosity) of the resultant polymer. Additionally, when the reaction temperature was reduced to 83° C. (run 5), the yield and molecular weight remained high.

Although the process of the present invention will be directed primarily to the polymerization of trimethylsilylpropyne in the presence of $TaCl_5$ with tertiary amines, it is not intended that the process be limited to the particular silylalkyne or metal halide and those skilled in the art will recognize that the present invention is broadly applicable to the polymerization of other tri-substituted silylalkynes, within the formula as hereinabove set forth, as well as other Group VB and VIB metal halides, to produce other polymeric silylalkynes such as polymeric triethylsilylpropyne, tributylsilylpropyne, trimethylsilylbutyne and the like.

Having thus described the present invention, what is now deemed appropriate for Letters Patent is set out in the following appended claims.

What is claimed is:

1. In a process for the polymerization of a trisubstituted silylalkyne in an organic solvent in the presence of a Group VB or VIB metal halide catalyst, to produce a polymer having the general structural formula:

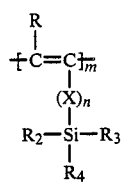

wherein $R_1$ is a linear or branched $C_1$–$C_4$ alkyl group; $R_2$ and $R_3$ are independently linear or branched $C_1$–$C_6$ alkyl groups; $R_4$ is a linear or branched $C_1$–$C_{12}$ alkyl group or aryl group; X is a $C_1$–$C_3$ alkyl group or phenyl; m is at least 100 and n is 0 or 1, the improvement which comprises increasing the rate of polymerization of the trisubstituted silylalkynes and the molecular weight of the resulting polymer by carrying out said polymerization in the presence of an effective amount of a tertiary amine compound.

2. A process according to claim 1 wherein the tri-substituted silylalkyne is trimethylsilylpropyne.

3. A process according to claim 1 wherein the metal halide catalyst is $TaCl_5$.

4. A process according to claim 1 wherein the tertiary amine is employed in up to equal molar amounts based on the metal halide employed.

5. A process according to claim 4 wherein the tertiary amine is employed in an amount of from between about 5 and 25 mole percent based on the metal halide.

6. A process according to claim 1 wherein the tertiary amine is pyridine.

7. A process according to claim 1 wherein the tertiary amine is triethylamine.

8. A process according to claim 1 wherein the tertiary amine is N,N-dimethylaniline.

9. A process according to claim 1 wherein the polymerization is carried out at a temperature is between about 30° C. and 100° C.

10. A process according to claim 1 wherein the organic solvent is toluene.

11. In a process for the polymerization of trimethylsilylpropyne in an organic solvent in the presence of a Group VB or VIB metal halide catalyst the improvement which comprises increasing the rate of polymerization of the trimethyl silylpropyne and the molecular weight of the resulting polymer by carrying out said polymerization in the presence of an effective amount of a tertiary amine compound.

* * * * *